United States Patent [19]

Hughes

[11] Patent Number: 5,209,768
[45] Date of Patent: May 11, 1993

US005209768A

[54] METHOD OF IMPROVING SOD GROWTH

[75] Inventor: John Hughes, Arlington Heights, Ill.

[73] Assignee: American Colloid Company, Arlington Heights, Ill.

[21] Appl. No.: 715,607

[22] Filed: Jun. 14, 1991

[51] Int. Cl.$^5$ .............................................. H01N 33/00
[52] U.S. Cl. ..................... 504/313; 47/57.6; 71/27; 71/903; 71/904; 71/DIG. 1; 504/116
[58] Field of Search ................ 71/27, 64.07, 903, 77, 71/79, DIG. 1; 47/574

[56] References Cited

U.S. PATENT DOCUMENTS

| | | | |
|---|---|---|---|
| 2,971,292 | 2/1961 | Malecki | 47/58 |
| 3,336,129 | 8/1967 | Herrett et al. | 71/92 |
| 3,373,009 | 3/1968 | Pruitt et al. | 71/28 |
| 3,831,317 | 8/1974 | Porte | 47/58 |
| 3,900,378 | 8/1975 | Yen et al. | 204/159.14 |
| 3,973,355 | 8/1976 | McKenzie | 47/37 |
| 4,034,508 | 7/1977 | Dedolph | 47/84 |
| 4,124,748 | 11/1978 | Fujimoto et al. | 526/8 |
| 4,238,374 | 12/1980 | Durham et al. | 260/17.4 GC |
| 4,241,537 | 12/1980 | Wood | 47/77 |
| 4,320,040 | 3/1982 | Fujita et al. | 524/459 |
| 4,329,436 | 5/1982 | Dedolph | 521/99 |
| 4,439,522 | 3/1984 | Dedolph | 521/159 |
| 4,495,310 | 1/1985 | Dedolph | 521/99 |
| 4,525,527 | 6/1985 | Takeda et al. | 524/831 |
| 4,552,938 | 12/1985 | Mikita et al. | 526/240 |
| 4,559,074 | 12/1985 | Clarke | 71/24 |
| 4,677,174 | 6/1987 | Alexander et al. | 526/240 |
| 4,906,276 | 3/1990 | Hughes | 71/77 |
| 4,985,061 | 1/1991 | Hughes | 71/68 |
| 4,985,062 | 1/1991 | Hughes | 71/77 |

*Primary Examiner*—Ferris Lander
*Attorney, Agent, or Firm*—Marshall, O'Toole, Gerstein, Murray & Bicknell

[57] ABSTRACT

A method of improving the yield of a germinating sod crop and a method of promoting the root formation and the vegetative growth of transplanted sod utilizing an aqueous gel including a highly-absorbent, crosslinked, mixed salt of homopolymerized or copolymerized acrylic acid. The aqueous gel utilized in the method of the present invention demonstrates an improved sod crop yield and improved sod growth even in the absence of plant nutrients.

23 Claims, No Drawings

SUMMARY OF THE INVENTION

In brief, the present invention is directed to a method of improving the yield of a germinating sod crop, and to a method of improving the root formation and the vegetative growth of transplanted sod, especially sod transplanted on an incline, by utilizing an aqueous gel including a highly-absorbent, crosslinked salt of a polyacrylate polymer It has been found that the sod crop yields are increased by utilizing an aqueous gel of the polyacrylate salt in the absence of inert solid aggregates.

In accordance with the present invention, an aqueous gel, formed from a mixed salt of a highly-absorbent, crosslinked homopolymer or copolymer of acrylic acid, can improve the yield of a sod crop at the original sod germination site, and can improve the root formation and the vegetative growth of sod transplanted from a germination site, such as a sod farm, to establish a new lawn. Surprisingly and unexpectedly, the method of the present invention has been found especially effective when an aqueous gel formed from the mixed salt of a crosslinked homopolymerized or copolymerized acrylic acid is used in the absence of an inert solid aggregate, a fertilizer or other plant nutrients.

Therefore, the present invention is directed to a method of improving the root formation and vegetative growth of sod, both at the sod germination site and at the transplant site, by using an aqueous gel comprising a mixed salt of a water-absorbent, crosslinked homopolymer or copolymer of acrylic acid. The mixed salt of the polymers useful in the present invention has unexpectedly and surprisingly shown increased sod crop yield and increased root formation and vegetative growth of the germinating or the transplanted sod when compared to similar non-mixed salts of polyacrylic acid, and when compared to other crosslinked water-absorbent polymers, such as hydrolyzed starch-acrylonitrile graft polymers.

More particularly, the present invention is directed to a method of improving the crop yield of a germinating sod crop, and to a method of improving the root formation and the vegetative growth of germinating sod and of transplanted sod, by utilizing an aqueous gel including a homopolymer or copolymer of acrylic acid that is neutralized with both potassium and ammonium alkalis. Compared to polymers of similar chemical structure, the polymers used in the method of the present invention have shown a superior ability to increase the yield of the sod crop and to promote sod life and esthetic sod properties. Without being limited to any particular mechanism, it is theorized that such improvements in sod crop yield, root formation and vegetative growth are due to the method of manufacture of the polymer wherein a heated aqueous solution comprising (A) acrylic acid neutralized 70 to 100 mole percent with ammonium and potassium alkalis; and (B) a water-miscible to water-soluble polyvinyl monomer, and water having a combined monomer concentration of (A) plus (B) of 30 to 80 wt. % is subjected to polymerization in the presence of a polymerization initiator without external heating while allowing water to evaporate during polymerization. Takeda et al., U.S. Pat. No. 4,525,527; Mikita et al., U.S. Pat. No. 4,552,938; and Alexander et al., U.S. Pat. No. 4,677,174 disclose methods of making similar polymers without the step of external heating.

Similarly, copolymers that are useful in the method of the present invention are synthesized by an aqueous polymerization of (A) acrylic acid neutralized 70 to 100 mole percent with ammonium and potassium alkalis; with (B) styrene in an amount of 0% to 25% based on the weight of acrylic acid or acrylate, computed as based on acrylic acid; and (C) a water-miscible or a water-soluble polyvinyl monomer in an amount of 0.001 to 0.3 weight percent based on the total weight of (A), (B) and (C).

In another embodiment, other copolymers that are useful in the method of the present invention are synthesized by an aqueous polymerization of (A) acrylic acid neutralized 70 to 100 mole percent with ammonium and potassium alkalis; with (B) acrylamide in a mole ratio of 70 to 100 mole percent (A) to 30 to 0 mole percent (B); and (C) a water-miscible or a water-soluble polyvinyl monomer in an amount of 0.001 to 0.3 weight percent based on the total weight of (A), (B) and (C).

Therefore, one aspect of the present invention to provide a method of increasing the crop yield of a germinating sod crop. It is also an aspect of the present invention to provide a method of increasing the yield of a sod crop, and to improve the root formation and the vegetative growth of transplanted sod, by utilizing an aqueous gel including a highly-absorbent, crosslinked polymer.

Another aspect of the present invention is to provide a method of increasing the crop yield, root formation and vegetative growth of sod by utilizing a homopolymerized or copolymerized acrylic acid neutralized with both potassium and ammonium alkalis.

Another aspect of the present invention is to provide a method of increasing the crop yield and promoting the root formation and the vegetative growth of sod by synthesizing potassium and ammonium-neutralized, homopolymers and copolymers of acrylic acid that are suitable for supplying germinating sod and transplanted sod with the required water and nutrients for their continued growth and life.

Another aspect of the present invention is to increase the commercially useful life of a harvested sod crop by contacting the root area of the harvested sod with an aqueous gel including a mixed salt of a crosslinked, homopolymerized or copolymerized acrylic acid such that water included in the gel is released to the harvested sod upon demand.

Still another aspect of the present invention is to provide a method of increasing the crop yield of germinating sod and promoting the root formation and the vegetative growth of germinating or transplanted sod by utilizing an aqueous gel including the mixed potassium and ammonium salt of a homopolymer or copolymer of acrylic acid, in the absence of plant nutrients, inert solid aggregates or agricultural or horticultural adjuvants.

These and other aspects and advantages of the present invention will become apparent from the following detailed description of the invention.

DETAILED DESCRIPTION OF THE INVENTION

Sod is defined as grass-covered earth, or turf, about one to two inches thick, that is well-knitted by grass plant roots, rhizomes and stolons and that can be used for lawn establishment. Sodding is a fast and satisfactory method of the establishing a lawn. Although sodding is the most expensive method of establishing a lawn, sodding is preferred in areas such as steep slopes, terraces, and sites where grass seedlings cannot become well established because of traffic conditions. Further-

METHOD OF IMPROVING SOD GROWTH

FIELD OF THE INVENTION

The present invention relates to a method of improving the yield of a germinating sod crop and to a method of promoting the root formation and the vegetative growth of transplanted sod. In particular, improved sod yield, root formation and vegetative growth are demonstrated for a new sod crop germinating at a sod farm and for sod transplanted from a germination site to establish a new lawn. More particularly, the present invention relates to a method of improving the crop yield, root formation and vegetative growth of sod by utilizing an aqueous gel including a highly-absorbent, crosslinked, mixed salt of homopolymerized or copolymerized acrylic acid The mixed salt of the polymerized acrylic acid forms an aqueous gel that maintains water in contact with the root zone of the sod and releases water to the roots of the germinating sod or the transplanted sod as needed, and, surprisingly, improves the root formation and vegetative growth of the germinating sod or the transplanted sod in the absence of plant nutrients, growth promoters and other similar agricultural and horticultural adjuvants. The aqueous gel provides a continuous and uniform amount of water to the root zone of the sod, especially to sod transplanted on an incline.

BACKGROUND OF THE INVENTION

Highly absorbent, crosslinked polymers have found wide use in a variety of applications, including sanitary goods, hygienic goods, water retaining agents, dehydrating agents, sludge coagulants, condensation preventing agents and release control agents for various chemicals. Water-absorbent polymers are available in a variety of chemical forms including substituted and unsubstituted natural and synthetic polymers such as hydrolysis products of starch-acrylonitrile graft polymers, carboxymethylcellulose, crosslinked polyacrylates, polyvinyl alcohols, polyacrylonitrile, polyvinylpyrrolidones, sulfonated polystyrenes, hydrolyzed polyacrylamides and polyethylene oxide.

In addition, aqueous gels, formed from the highly-absorbent crosslinked polymers of the present invention, have shown unexpected utility in increasing the crop yield of germinated plants. Such results are more surprising considering that it is not necessary to incorporate primary plant nutrients, micronutrients, growth promoters or other agricultural or horticultural adjuvants into the gel to increase the crop yields of germinated plants. It also has been found that the aqueous gels formed from the mixed salt polyacrylates of the present invention allow the roots of a newly-germinated, or of a transplanted, plant to withdraw the necessary water from the aqueous gel to preserve plant life and promote plant growth.

Water-absorbent polymers have been used both to preserve freshly cut ornamental plants and as a growth medium for seeds, seedlings and transplants. U.S. Pat. No. 2,971,292 discloses a number of gel-forming colloidal materials, including polyacrylic polymers, that preserve the life of freshly cut plants. However, these gel-forming colloidal materials require the use of plant nutrients and the use of an inert solid aggregate filler to free water from the gel and thus make the water available for plant uptake. As will be demonstrated more fully hereinafter, the inclusion of plant nutrients and inert solid aggregates into gels including a polymer of the present invention is unnecessary, and is potentially detrimental.

Other patents disclosing the use of water-absorbent polymers for use in plant preservation or as a plant growth medium include: U.S. Pat. No. 4,124,748, wherein a crosslinked copolymer of a vinyl ester and an unsaturated carboxylic acid ester, neutralized with a potassium or ammonium alkali, is suggested as a seed culturing media for plants; U.S. Pat. No. 4,241,537, wherein a nonionic, monolithic, crosslinked polyurethane is used as a soil plug for growing plants; U.S. Pat. No. 4,559,074, wherein a substantially nonionic crosslinked polyacrylamide is used as an additive for a plant growth medium; U.S. Pat. No. 4,238,374, wherein a water-insoluble crosslinked polymer and inert aggregate particles are utilized to preserve floral arrangements; U.S. Pat. No. 4,320,040, wherein a polyvinyl alcohol and polymerized acrylic acid composition is used as a water-retaining agent for plants or soils; and U.S. Pat. No. 3,336,129, wherein an absorbent crosslinked polymer and sand or soil are admixed to form plant growth modifiers. Several other U.S. Patents disclose polymers used in plant growth media, including U.S. Pat. Nos. 3,373,009; 3,900,378; 3,973,355; 4,034,508; 3,831,317; 4,495,310; 4,439,552 and 4,329,436.

The methods and compositions disclosed in the prior art require or recommend that the gels formed from the water-absorbent polymer include fertilizers, solid aggregates or a combination thereof. In addition, several of the prior art methods are difficult or impractical to use because: the polymer is not readily dispersed in water; the polymer, such as a starch-acrylonitrile graft polymer, is expensive and difficult to make; the polymer is subject to hydrolysis or bacterial degradation unless parameters, such as pH, are carefully controlled; the physical parameters, such as pH, necessary to protect the integrity of the polymer may adversely affect certain plants; and the polymer produces a gel that does not readily surrender water to the plants.

Therefore, it would be extremely advantageous to provide a method of improving the crop yield of germinating sod, and a method of improving the root formation and the vegetative growth of transplanted sod, by utilizing an aqueous gel including an economical, easy-to-synthesize, readily dispersible, nondegrading, water-absorbent polymer It also would be advantageous if the polymer produced gels capable of releasing sufficient water to the plant on demand without the need of inert solid aggregates. Finally, it would be most advantageous, both with respect to economy and ease of gel information, if an aqueous gel formed from the polymer could be used without the addition of fertilizers and the like, while still providing nutrients to the sod.

Any method utilizing a polymer having the above-described qualities to increase the root formation and the vegetative growth of transplanted sod, or the crop yield of germinating sod, would enhance and broaden the use of water-absorbent polymers in the agricultural and horticultural areas. Preferably, any such method should utilize an economical, easy-to-manufacture polymer that possesses qualities necessary to support plant life and improve sod crop yield, root formation and vegetative growth, and that can be used at low percentages.

more, by sodding, a usable lawn is obtained in about two weeks, whereas seeding requires from about ten weeks to about fifteen weeks to obtain a usable lawn.

Sod is produced on farms having suitable soil properties, such as particle size, drainage and organic content, and situated in the correct climate to maximize the germination of grass seeds and the development of the sod. Overall, the goal in sod production is to produce a well-knit sod in the shortest time possible. Successful grass seed germination depends upon an adequate and continuous source of light, moisture and warmth. Without water, the seeds cannot germinate even when light and warmth conditions are ideal. Root rhizome production also is an important factor in producing a sod crop, and therefore proper fertilization and watering programs are essential.

Sod is harvested as soon as it has knitted sufficiently to permit handling without tearing. Usually, from about six months to about two years are required to produce commercially-acceptable sod. Therefore, any method that reduces the amount of time necessary to produce a sod crop, or that reduces the amount of irrigation necessary during periods of inadequate rainfall, would be an advance in the art of sod production.

Sod is harvested in strips of from 1 to about 2 inches in thickness, with widths ranging from about 12 to about 24 inches and lengths ranging from about 4 feet to about 6 feet. The thickness of harvested sod is an important factor in the productive life of the sod field as well as in the handling and laying of the harvested sod. For example, thinly cut sod handles more easily, lays better and knits faster than thickly cut sod. Furthermore, sod establishes a lawn predominantly by forming new grass roots rather than by the branching old, severed grass roots. These new roots emerge faster from thin sod. However, soil adhering to sod is an important source of moisture, and thin sod is therefore less tolerant to drought. Furthermore, the poorer the sod density and sod strength, the thicker the sod must be cut.

Accordingly, it would be advantageous to produce a sod that can be harvested by a thin cut that is easy to handle and lay, and that does not lose its vitality within a short time after harvest. For example, harvested sod should be layed within a few days, and sod injury occurs if the temperature during this time rises to about 100° F. Therefore, any method that substantially increases the time wherein sod, and especially thin cut sod, could be layed, or decreases the adverse effects of elevated temperature on harvested sod, would improve the yield of a sod crop and increase the ability of the harvested sod to form new roots and establish a new lawn after transplanting.

Furthermore, after laying sod, irrigation water should be applied liberally, and the sod should be kept well-watered until the lawn is established. Often constant irrigation is difficult or impractical, therefore it would be desirable to provide a method of supplying sufficient water to transplanted sod without the need for constant and uniform irrigation. In addition, after the sod is established, normal good management practices then are necessary to maintain a high quality turf. Accordingly, any method that allows the irrigation water to be used more beneficially by the sod will decrease the amount of water used in the irrigation process, thereby making lawn establishment more economical by saving man hours of labor and volumes of water.

Irrigating a sod crop or transplanted sod is important because water is necessary for grass seed germination, cellular development, tissue growth, photosynthesis and temperature control. Water acts as a solvent and a carrier of plant food materials because nutrients dissolved in the soil are absorbed by the roots and then translocated to all parts of the grass plant by water. The plant food manufactured in grass leaves also is distributed throughout the plant by water. Furthermore, water transpired by the leaves serves as a temperature regulator for the grass plant, and the amount of water within the cells of the grass leaves helps counteract the adverse effects of traffic. To perform these functions, relatively large quantities of water are required to assure normal grass growth and development. Several factors determine the rate that turf plants use water, such as the type of grass grown, climatic conditions, the rate of growth, environment, the frequency and height of cut and soil conditions.

In general, turfgrasses use about one-quarter inch of water per day, including water used by the plant, transpiration water and soil evaporation water. Accordingly, sufficient water must be present in the soil, and be available to the plant. If insufficient water is available, the grass is put under stress and grass growth, development and physiological processes are impaired. Water mainly enters the grass plant through the roots, and the root hair zone is most active in water absorption. The water supply, soil temperature, transpiration rate, and extent and effectiveness of the root system each effect water absorption. Therefore, the amount of water in the soil, and how the soil liberates the water to the roots of the sod is important in the development and growth of sod.

The different types of grasses used to establish a lawn have different water requirements and different resistance to drought. Drought conditions result from prolonged water stress, such as during the dry hot summer months, especially on light sandy soils in arid or semi-arid climates or environments. Generally, a grass with the strongest root system wilts last, and grass without the weakest root system wilts first. For example, fescue has rather low wilting tendency during drought conditions whereas bentgrass and ryegrass wilt more quickly.

However, grasses can demonstrate the effects of a drought even though a sufficient amount of water apparently is present. This drought-like phenomena generally is related to the properties of the soil under the grass. Therefore, the quantity of water used for irrigation of the grass depends upon soil type and soil quality. The two important soil properties affecting the amount of necessary irrigation water are the capacity of the soil to absorb water and the ability of the soil to store water. These two properties are closely related to the number and size of pores in the soil.

An average productive soil contains about 50% pore space, ranging in size from fine capillary pores to large aeration pores, to accommodate water and air. A large portion of the available water retained in the soils is in the capillary pores. The larger aeration pores drain rapidly and affect capacity rates, water movement, drainage, and aeration in the soil. Soils differ greatly in the ratio of large to small pores due to differences in soil texture, structure, presence of organic matter, and soil management. Percolation is good in coarse sandy soils, but poor in heavy clay soils where soil particles and pores are small and water retention is good. In general, coarse soils, i.e. sandy soil, store from about 0.5 inches to about 1.5 inches of usable water for each one-foot depth of soil, whereas medium textured soil, i.e. silt loam soil, stores from about 1.5 inches to about 2.5 inches of usable water per one-foot depth of soil and heavy soils, i.e. clay soils, store up to 3.0 inches per foot of soil depth. Silt loam soil, having a good balance of sand, silt and clay, usually has the highest available water-holding capacity. Organic matter increases infiltration rates in both coarse textured and fine textured soils.

In addition, water availability to the grass plant decreases when high salt concentrations are present in soil solutions. Fertilizers can contribute to a high salt concentration in the soil. Toxic salt concentrations in the soil solution make it impossible for the plant to extract water from the soil. The salt increases osmotic pressure, and consequently water availability to grass roots decreases because water moves from an area of lesser salt concentration to an area of greater salt concentration. When the salt concentration is greater in the soil solution than in the plant itself, the plant roots are unable to extract water from the soil due to the concentration barrier Thus, the turf can wilt even though soil moisture is adequate.

In order to maintain satisfactory vegetative growth, an adequate amount of soil water must be in the grass root zone at all times. Soil moisture also should be maintained at as uniform a level as possible. For example, watering merely to break dormancy attributed to drought conditions can add to the exhaustion of plants, whereas continuous water during a dormant period is beneficial. The available water-holding capacity of a soil determines how often water is applied to the soil to maintain plant growth. New grass seedlings and transplanted sod are shallow rooted, and therefore require frequent, light waterings to sufficiently soak the soil such that surface water and subsurface water are in contact. The rate of application also should not exceed the amount of water the soil is able to absorb. Other problems also can affect water management of grassy areas, such as layers of coarse sand, gravel or debris just under the soil surface, and thatch accumulation can act as a water-proof barrier.

Therefore, general recommendations on specific watering practices are difficult to provide, but, overall, the amount of water to apply at any one time is the amount necessary to fill the soil pores in the root zone. If watering is excessive and too frequent, the supply of air in the soil is diminished by filling all of the air spaces with water. Then, root growth stops and the root damage ensues. The damaged roots then are invaded by rot-causing microorganisms in the soil, leading to plant death. Conversely, if watering is too light and infrequent, the water does not move sufficiently deep into the soil. Shallow watering leads to shallow-rooted plants that do not tap water reserves deep in the soil. Consequently, the plant may not survive even a brief period of drought or high temperature.

Therefore, in accordance with the present invention, an aqueous gel, formed from a highly absorbent, cross-linked polymer, unexpectedly and surprisingly improves the yield of a germinating sod crop and promotes the root formation and vegetative growth of a germinating sod crop and of transplanted sod. As will be discussed more fully hereinafter, the polymers useful in the method of the present invention are mixed potassium and ammonium salts of a homopolymer or copolymer of acrylic acid. These polymers form aqueous gels that exhibit a substantial increase in the yield of a germinating sod crop. In addition, an aqueous gel formed from a polymer of the present invention also improves the root formation and vegetative growth of transplanted sod, thereby reducing the amount of sod lost to drought and other adverse climatic conditions after transplanting. The aqueous gel can be applied to the soil, or to the surface of the sod that contacts the soil, to provide a sufficient and constant supply of water to the root area of the sod. In addition, a gel so applied helps offset the effects of gravity, such that sod planted on an incline has a sufficient and more uniform supply of water because the gel helps hold water in contact with the root area of the sod.

Also, the polymers useful in the method of the present invention possess sufficient water-absorbing and swelling ability such that suitable gels are formed using very low amounts of polymer, therefore providing a sufficient amount of free, unbound water to the plant for uptake upon demand. In addition, an aqueous gel formed from the mixed salt polymers of acrylic acid sufficiently releases water to the roots of the sod upon demand.

In addition to clays and natural gums, several types of water-absorbing crosslinked polymers have been used to form aqueous gels that are useful as, or in, a plant growth medium. However, the previous methods and compositions all possess disadvantages that severely limit their practical utility. For instance, gels made from clays are often difficult and messy to prepare; polymers based on natural gums or natural polymers, such as starch, are subject to chemical and bacterial degradation; some polymers must be used in a high percentage and then bind the water to such a degree that sufficient water is not available for use by the plant; and various polymers utilized to make the gels are expensive and difficult to prepare.

As will become apparent from the following detailed description of the invention, the method of the present invention utilizes polymers that are easy and economical to synthesize, resist degradation and possess the requisite physical characteristics, such as gel strength, fast water-absorption and the ability to release water, that make them ideal for use in plant growth media. The method of the present invention utilizes polymers that are nontoxic to plants; that are sufficiently crosslinked to be water-insoluble, yet are able to absorb water and swell and disperse in water; that are effective at low percentages; that easily release absorbed-water from the gel to materials having a lower concentration of water than the gel; and that are sufficiently inert such that the gel can include other common additives without adversely affecting the basic utility of the polymer.

The polymers that have found particular utility in the method of the present invention include the mixed salts of homopolymerized or copolymerized acrylic acid. More particularly, the mixed potassium and ammonium salts of polyacrylic acid, or the mixed potassium and ammonium salts of copolymers of acrylic acid with styrene or acrylamide can be used to form aqueous gels that increase the crop yield of germinated plants. However, to achieve the full advantage of the present invention, a polyacrylic acid, neutralized both with a potassium alkali and an ammonium alkali, is used to form an aqueous gel for improving the yield of a sod crop and for promoting the root formation and vegetative growth of sod.

As will be more fully discussed hereinafter, an aqueous gel formed from the potassium and ammonium mixed salt of polyacrylic acid, or from the potassium and ammonium mixed salt of acrylic acid copolymerized with styrene or acrylamide, surprisingly and unexpectedly increases the yield of a sod crop and promotes the growth of transplanted sod. The polymers used in the method of the present invention are synthesized from a monomer mix including ammonium acrylate and potassium acrylate, theoretically accounting for the improved results over acrylic acid polymers that are neutralized after polymerization. Preneutralization of the monomer mix assures not only a more complete neutralization, but also a more random and even distribution of the ammonium and potassium ions along the polymer chain.

More particularly, polymers useful in the method of the present invention are synthesized, for example, by first preparing a hot aqueous solution comprising acrylic acid neutralized 70 to 100 mole percent, a water-miscible or water-soluble polyvinyl monomer, water and, when desired, an organic solvent having a boiling point of from about 40° C. to about 150° C., wherein the acrylate monomer and the polyvinyl monomer are present in a combined concentration of 30 to 80 wt. %. To achieve the full advantage of the present invention, the acrylate and polyvinyl monomers are present in a combined concentration of less than 70 weight percent of the monomer solution.

In accordance with another important embodiment of the present invention, the combined concentration of the acrylate and polyvinyl monomers is less than 55 weight percent of the monomer solution. The concentration of the monomers is determined considering the state of the solution (i.e., as to whether or not the monomers can be completely dissolved in water), ease of the reaction of the monomers, escape of the monomers due to spattering during the reaction, and the like. The aqueous solution can be prepared easily by placing the acrylic acid, the potassium and ammonium alkalis, e.g. potassium hydroxide and ammonium hydroxide, for neutralizing the acid and the polyvinyl monomer into water in such amounts that the resulting solution has the above-mentioned monomer concentration. In accordance with one important embodiment of the present invention, the ratio of potassium ions to ammonium ions should range from approximately 70:30 to 30:70. To achieve the full advantage of the present invention the ratio of potassium ion to ammonium ions should range from approximately 55:45 to 45:55. To dissolve the monomers thoroughly, the mixture can be heated to an elevated temperature.

Although it is desirable to use the neutralizing agent usually in an amount sufficient to neutralize acrylic acid 100 mole %, it is not particularly necessary to neutralize the acid 100 mole However, the neutralizing agents are included in such an amount as to achieve not less than about 70 mole neutralization, because too large a quantity of free acrylic acid in the aqueous solution is likely to partially splash, or vaporize, out of the reaction vessel. Accordingly, a portion of the acrylic acid is lost during the reaction, thereby causing a reduced degree of polymerization. The use of an excessive amount of the neutralizing agent does not produce any particular problem or disadvantage, but the excess neutralizing agent does not participate in the polymerization reaction and therefore is useless and wasted.

In accordance with another important embodiment of the present invention, acrylic acid neutralized 70-100 mole percent is mixed with 1% to 25%, based on the weight of acrylic acid, styrene and a water-miscible or water-soluble polyvinyl monomer, in an aqueous solution at a temperature of about 20° C to about 100° C. In accordance with the still another important embodiment of the present invention, acrylic acid neutralized 70-100 mole percent is mixed with acrylamide in a mole ratio of 70 to 100 mole percent acrylic acid to 30 to 0 mole percent acrylamide; and a water-miscible or water-soluble polyvinyl monomer, in an aqueous solution at a temperature of about 20° C. to about 100° C.

In each embodiment, the solution is subjected to a polymerization reaction and a crosslinking reaction by the addition of a polymerization initiator. The polymerization and crosslinking reactions proceed sufficiently within a very short period of time, and if the monomer concentration is at least 30 percent by weight of the aqueous monomer mixture, the heat of the polymerization and crosslinking reactions evaporates water rapidly from the aqueous reaction composition to form a dry, i.e. less than 15 percent by weight water, solid water-absorbent resin without the need for a subsequent drying step. The solid easily can be pulverized into a powder suitable for the desired use.

The polyvinyl monomer used to crosslink a polymer of the present invention should be miscible with, or soluble in, water so that the polyvinyl monomer is dissolved or dispersed uniformly throughout the aqueous solution of the monomer mixture. Examples of such polyvinyl monomers include bisacrylamides such as N,N'-methylenebisacrylamide and N,N'-methylenebismethacrylamide; polyacrylic acid esters or polymethacrylic acid esters represented by the following formula (I); and diacrylamides represented by the following formula (II). Among these, especially preferable are N,N'-methylenebisacrylamide, N,N'-methylenebismethacrylamide and like bisacrylamides.

Formula (I):

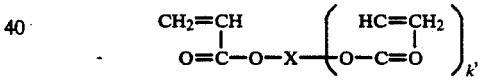

wherein X is ethylene, propylene, trimethylene, hexamethylene, 2-hydroxypropylene, $(CH_2CH_2O)_nCH_2CH_2-$ or

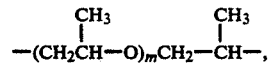

n and m are each an integer of from 5 to 40, and k is 1 or 2.

Formula (II):

wherein l is 2 or 3.

The polyvinyl monomer is used in an amount of about 0.001 to about 0.6 wt. % of the combined amount of polyvinyl monomer, acrylic acid, styrene and acrylamide monomers in the aqueous monomer mixture. In accordance with another important embodiment of the present invention, the polyvinyl monomer crosslinking agent should be present in the aqueous solution in an amount of at least 0.2 wt %, based on the total weight of monomers to provide a resin sufficiently crosslinked to prevent water solubility. If the polyvinyl monomer is included in the aqueous solution in an amount of about 0.2 to about 0.6 weight percent based on the total weight of acrylic acid, styrene, acrylamide and polyvinyl monomers, the resulting polymer has a sufficient degree of crosslinking to avoid solubilization on absorption of water If the polyvinyl monomer is included in the aqueous solution in an amount greater than about 0.6 weight percent based on the total weight of the monomer, the polymer may possess too high a degree of crosslinking, and water-absorbing properties can be adversely affected.

The aqueous mixed monomer solution is heated and thereafter subjected to polymerization or copolymerization and crosslinking reactions with the addition of a polymerization initiator. Although the temperature of the aqueous mixed monomer solution is not particularly limited because the polymerization of the mixed monomer solution is initiated by the addition of the initiator, the temperature is usually about 50° C. to about 85° C., preferably about 60° C. to about 75° C.

Various polymerization initiators are known for use in preparing polyacrylates and are useful in the method of the present invention. Examples of useful initiators are redox initiators comprising a reducing agent, such as a sulfite or bisulfite of an alkali metal, like ammonium sulfite or ammonium bisulfite, and an initiator, such as a persulfate of an alkali metal or ammonium persulfate, in combination with the reducing agent; azo initiators including azobisisobutyronitrile, 4-t-butylazo-4'-cyanovaleric acid, 4,4'-azobis(4-cyanovaleric acid) and 2,2'-azobis(2-amidinopropane) hydrochloride and the like. These initiators can be used singly or in a suitable combination. Of these, especially preferred initiators are a redox initiator comprising ammonium persulfate and sodium hydrogen sulfite, and azo initiators such as azobisisobutyronitrile and 2,2'-azobis(2-amidinopropane)-hydrochloride.

The initiators usually are used most advantageously in the form of an aqueous solution, but also can be used after solubilizing in another suitable solvent. The initiator normally is used in an amount, calculated as solids, of about 0.1% to about 10%, preferably about 0.5% to about 5%, of the combined weight of the monomers, namely acrylate (and free acrylic acid); styrene (if any); acrylamide (if any); and polyvinyl monomer crosslinking agent. Depending on the amount and the kind of the initiator, the initiator can be used together with isopropyl alcohol, an alkyl mercaptan or other chain transfer agents to control the molecular weight of the polyacrylate polymer or copolymer to be obtained.

The following Examples are illustrative of the polymers that can be utilized in the method of the present invention.

EXAMPLE 1

To deionized water in a storage vessel is added 58.81% acrylic acid first, then 11.76% potassium hydroxide, 11.76% ammonium carbonate and 14.70% ammonium hydroxide serving as neutralizing agents, wherein the percents are weight percents based on the total weight of the monomer solution formed. Thereafter, 0.03% of N,N'-methylenebisacrylamide as a polyvinyl monomer is added to prepare an aqueous solution of potassium acrylate and ammonium acrylate having a neutralization degree of about 90% and a combined monomer concentration of 58.84 wt. % in 2.79% of water. The monomer solution is held in a storage vessel until the polymerization process begins by feeding a polymerization initiator from a second storage vessel simultaneously with the monomer solution from the first storage vessel into a reaction vessel.

The aqueous solution in the reaction vessel is maintained at 70° C., and the aqueous solution is continuously admixed with an initiator to maintain a concentration of 0.15% of 2,2-azobis(2-amidinopropane)hydrochloride initiator. The final solution is as follows:

| CHEMICALS | PERCENT |
| --- | --- |
| ACRYLIC ACID | 58.81% |
| POTASSIUM HYDROXIDE | 11.76% |
| AMMONIUM CARBONATE | 11.76% |
| N,N'-METHYLENEBISACRYLAMIDE | 0.03% |
| AZO POLYMERIZATION INITIATOR | 0.15% |
| AMMONIUM HYDROXIDE (30% aqueous ammonia) | 14.70% |
| WATER | 2.79% |
| TOTAL | 100.00% |

The polymer is allowed to complete curing for about 30 minutes at ambient temperature to give a dry, solid mass of a crosslinked potassium and ammonium polyacrylate product having a water content of 11% and a residual monomer concentration of 1200 ppm. The resin is made into a powder by a pulverizer.

EXAMPLE 2

The following mixed monomer solution was reacted in the same manner as described in Example 1 to give a dry, solid mass of crosslinked potassium/ammonium polyacrylate.

| CHEMICALS | PARTS BY WEIGHT | PERCENT |
| --- | --- | --- |
| ACRYLIC ACID | 16.80 | 54.15% |
| AMMONIUM HYDROXIDE (30% aqueous ammonia) | 4.20 | 13.54% |
| POTASSIUM HYDROXIDE | 4.20 | 13.54% |
| AZO POLYMERIZATION INITIATOR | 0.13 | 0.42% |
| GPTA (glycerol propoxy triacrylate molecular weight 428.5) | 0.002 | 0.01% |
| AMMONIUM CARBONATE | 3.31 | 10.67% |
| WATER | 2.30 | 7.67% |
| TOTAL | 30.94 | 100.00% |

EXAMPLE 3

The following mixed monomer solution was reacted in the same manner as described in Examples 1 and 2 to give a dry, solid mass of crosslinked potassium/ammonium acrylate copolymer including styrene.

| CHEMICALS | PARTS BY WEIGHT | PERCENT |
| --- | --- | --- |
| ACRYLIC ACID | 16.80 | 53.57% |
| AMMONIUM HYDROXIDE (30% aqueous ammonia) | 4.20 | 13.39% |
| POTASSIUM HYDROXIDE | 4.20 | 13.39% |
| STYRENE | 0.81 | 1.08% |
| AZO POLYMERIZATION INITIATOR | 0.13 | 0.42% |
| GPTA (glycerol propoxy triacrylate molecular weight 428.5) | 0.002 | 0.01% |
| AMMONIUM CARBONATE | 3.31 | 10.55% |

| CHEMICALS | PARTS BY WEIGHT | PERCENT |
|---|---|---|
| WATER | 2.38 | 7.59% |
| TOTAL | 31.83 | 100.00% |

EXAMPLE 4

| CHEMICALS | PERCENT |
|---|---|
| ACRYLIC ACID | 58.23% |
| STYRENE | 1.585 |
| POTASSIUM HYDROXIDE | 11.76% |
| AMMONIUM CARBONATE | 11.76% |
| N,N'-METHYLENEBISACRYLAMIDE | 0.03% |
| AZO POLYMERIZATION INITIATOR | 0.15% |
| AMMONIUM HYDROXIDE (30% aqueous ammonia) | 14.70% |
| WATER | 1.79% |
| TOTAL | 100.00 |

The mixture of Example 4 is poured onto a traveling endless belt and spread thereover in the form of a layer about 10 mm in thickness. About 30 seconds thereafter, the mixture starts to polymerize, and the reaction is completed in about 1 minute. The maximum temperature of the mixture during the reaction is about 120° C.

The copolymer is allowed to complete curing for about 30 minutes at ambient temperature to give a dry solid strip of potassium/ammonium polyacrylate-polystyrene product having a water content of 11% and a residual monomer concentration of 1200 ppm. The strip is made into a powder by a pulverizer.

EXAMPLE 5

The following mixed monomer solution was reacted in the same manner as described in Example 4 to give a dry solid strip of potassium/ammonium polyacrylate-polystyrene product of low water content and low residual monomer concentration.

| CHEMICALS | PERCENT |
|---|---|
| ACRYLIC ACID | 56.01% |
| STYRENE | 2.80% |
| POTASSIUM HYDROXIDE | 11.76% |
| AMMONIUM CARBONATE | 11.76% |
| N,N'-METHYLENEBISACRYLAMIDE | 0.03% |
| AZO POLYMERIZATION INITIATOR | 0.15% |
| AMMONIUM HYDROXIDE (30% aqueous ammonia) | 14.70% |
| WATER | 2.79% |
| TOTAL | 100.00 |

EXAMPLE 6

The following mixed monomer solution is reacted in the same manner as described in Example 4 to give a dry solid strip of postassium/ammonium polyacrylate-polyacrylamide product of lower water content and lower residual monomer concentration.

| CHEMICALS | PERCENT |
|---|---|
| ACRYLIC ACID | 57.06% |
| ACRYLAMIDE | 1.11% |
| POTASSIUM HYDROXIDE | 11.76% |
| AMMONIUM CARBONATE | 11.76% |
| N,N'-METHYLENEBISACRYLAMIDE | 0.03% |
| AZO POLYMERIZATION INITIATOR | 0.15% |
| AMMONIUM HYDROXIDE (30% aqueous ammonia) | 14.70% |
| WATER | 3.43% |
| TOTAL | 100.00 |

EXAMPLE 7

The following mixed monomer solution is reacted in the same manner as described in Example 4 to give a dry solid strip of potassium/ammonium polyacrylate-polystyrene-polyacrylamide product of low content and low residual monomer concentration.

| CHEMICALS | PERCENT |
|---|---|
| ACRYLIC ACID | 56.49% |
| ACRYLAMIDE | 2.73% |
| POTASSIUM HYDROXIDE | 11.76% |
| AMMONIUM CARBONATE | 11.76% |
| N,N'-METHYLENEBISACRYLAMIDE | 0.03% |
| AZO POLYMERIZATION INITIATOR | 0.15% |
| AMMONIUM HYDROXIDE (30% aqueous ammonia) | 14.70% |
| WATER | 2.59% |
| TOTAL | 100.00 |

To demonstrate the new and unexpected results achieved by the mixed salt polyacrylates of the present invention, a highly-absorbent, crosslinked polymer, synthesized according to the method of Example 1, was tested for its ability to improve the yield of a germinating sod crop. An aqueous gel, comprising from about 0.4% to about 0.7% by weight of the crosslinked, insoluble mixed potassium/ammonium polyacrylate dispersed in tap water, was tested for its ability to improve the yield of a germinating sod crop. It was found that a gel comprising this low percentage of polymer was effective in promoting the root formation and vegetative growth of the germinating grass seed to provide a higher yield of commercially useful sod in a shorter time.

It has been found that the mixed salt polyacrylate can be added slowly to water, and dispersed, to form a gel. It is not necessary, or desirable, to use hot water to disperse the polymer. The dispersion process is not a dissolving process, but a physical water-absorption and polymer-swelling process, wherein the polymer absorbs many times it weight in water and swells many times its volume. Within a few minutes of its addition to the water, the mixed salt polyacrylate has absorbed sufficient water to swell and form a gel of the desired gel strength. In the tests on sod, the mixed salt polyacrylate can be applied to the soil either before or after the sod crop has been planted and started to germinate. Also, the mixed salt polyacrylate can be applied to the soil as a solid, followed by irrigating the soil to generate the mixed salt polyacrylate gel; or the mixed salt polyacrylate can be applied to soil as an aqueous gel including about 0.4% of the mixed salt polyacrylate. Regardless of the application method, the sod crop demonstrates an improved yield when grown in soil including an aqueous gel comprising from about 0.4% to about 0.7% of the mixed salt polyacrylate of the present invention.

Prior art method require a relatively large amounts of polymer to preserve plant life, promote plant growth and support plant stems. The prior art also teaches that increasing the percentage of polymer in the gel reduces the ability of the gel to give up water to the plant as the plant requires. For instance, in U.S. Pat. No. 4,238,374, increasing the amount of a monovalent salt of polyacrylic acid to coat the inert solid aggregate of the mixture resulted in the flowers dying four days earlier than in gels utilizing a lower percentage of polymer. This result has been attributed to a gel thickness that is too great for water uptake by the plants. Therefore, an important feature in the method of the present invention is the low percentage, of from about 0.4% to about 0.7% by weight, of the potassium/ammonium acrylate polymer that is necessary to obtain the unexpected improvement in the crop yield of sod.

Consequently, an important feature of the method of the present invention is the ability of the potassium/ammonium polyacrylate polymer to easily give up its absorbed water to the roots of germinating grass seeds, or to the roots of transplanted sod, upon demand. Several prior art polymers generate gels of relatively great gel strength, however, the absorbed water is held by these gels so tightly that the water is not available to the plant. Surprisingly, the polymers of the present invention are able to supply the germinating seeds of the sod crop, or the transplanted roots of the sod, with water that the sod requires. It the present invention surrenders water to the roots of the grass plants regardless of the characteristics of the soil, i.e., regardless of a clay soil or a sandy soil. Furthermore, the polymers used in the method of the present invention include nitrogen and potassium plant nutrients incorporated into the polymeric structure. Surprisingly, these plant nutrients are available to the roots of the grass plant as the germinating or transplanted sod requires the nutrients.

Furthermore, the method of the present invention is not limited to improving the yield of a germinating sod crop. In accordance with an important feature of the present invention, transplanted sod demonstrates improved root formation and vegetative growth, and decreased losses due to drought, soil conditions and other environmental factors, when a gel including a mixed salt polyacrylate is included in the growth medium. In general, improved root formation and vegetative growth of transplanted sod is provided if the aqueous gel of the mixed salt polyacrylate contacts the root area of the transplanted sod. In addition to positioning the transplanted sod to allow contact between the aqueous gel and the root area of the sod, several other methods of treating the transplanted sod with the aqueous gel are available. For example, after the sod has been harvested, the soil immediately surrounding the root area of the sod can be treated with the aqueous gel to allow contact between the aqueous gel and root area of the sod. Upon transplanting the sod, the gel already is in position to promote the root formation and vegetative growth of the sod. Alternatively, a developing sod crop first can be harvested from its germination site; then the aqueous gel is added to the void resulting from harvesting the sod from the soil; finally the germinated sod is reinserted into its original germination site until sufficiently mature for final harvesting. Therefore, overall, the root area of the sod is contacted with an aqueous gel comprising from about 0.4% to about 0.7% by weight of a mixed potassium and ammonium salt of a crosslinked polyacrylate, either before and after transplanting the sod.

Furthermore, it also is envisioned that the aqueous gel can be placed in a position sufficiently close to a planted grass seed, or in a position contacting a planted grass seed, such that after grass seed germination, the aqueous gel already is present in the soil for essentially immediate contact with the roots of the grass plant. It has been found that direct contact of a grass seed with the aqueous gel of the present invention does not adversely affect the germination of the grass seed. Therefore the aqueous gel can be positioned in the soil concurrently, and in contact, with the grass seed to provide an improved yield of a germinating sod crop.

As previously stated, the mixed polyacrylate salt of the present invention has nitrogen and potassium available for use by the germinating or transplanted sod. In addition, the mixed salt polyacrylates of the present invention have the ability to release water to the sod upon demand because the polymer does not bind the water to such an extent that the water in the aqueous gel is unavailable to plant. Such a result is surprising and unexpected for polymers that have such high water-retention capacities. It is a particular and distinct advantage of the mixed ammonium/potassium polyacrylate salts of the present invention that they have the ability to retain large amounts of water and that they also have the ability to surrender that water to the sod on demand. Accordingly, the mixed salt polyacrylates of the present invention assist sandy soils in retaining water and assist clay soils in releasing water to the roots of the grass plants. These unique capabilities thereby reduce moisture stress on the sod during dry or drought periods, in areas having poor soil properties, in areas where watering the sod is difficult or impractical, and where other environmental or climatic factors adversely affect sod establishment and growth. Consequently, sod vitality is increased and sod losses are reduced significantly. Generally, the polymers useful in the method of the present invention are capable of preferentially absorbing the water in relation to soil, and hold this moisture for release, upon demand, to the roots of the sod contacting the polymer. Therefore, by reducing the stress effects resulting from a lack of moisture and other environmental factors, more grass seeds germinate and more grass seedlings emerge from the soil to directly increase the yield of the sod crop.

The method of the present invention also can be used to improve the crop yields of any other cash crop such as sweet corn, brussel sprouts, beans, tomatoes and strawberries, or to reduce the number of lost transplants in plants such as tobacco, annuals and perennials, woody plants and ornamentals.

It should be understood that the present disclosure has been made only by way of preferred embodiment and that numerous changes in details of construction, combination and arrangement of parts can be resorted to without departing from the spirit and scope of the invention as hereunder claims.

I claim:

1. A method of increasing the yield of a germinating so-d crop comprising contacting a root of a grass plant with an aqueous gel comprising from about 0.4% to about 0.7% by weight of a mixed potassium and ammonium salt of a crosslinked, copolymerized or homopolymerized acrylate and covering the root of the grass plant and the aqueous gel with soil; wherein the mixed potassium and ammonium salt of a crosslinked, copolymerized or homopolymerized acrylate is prepared by mixing a monomer solution of (A) acrylic acid neutralized 70-100 mole percent with a potassium alkali and an ammonium alkali; (B) styrene in an amount of 0% to 25% based on the weight of acrylic acid and (C) a water-miscible to water-soluble polyvinyl monomer in a combined concentration of (A), (B) and (C) of at least 30 wt. %; with water to form a mixed monomer solution and initiating polymerization of monomers (A), (B) and (C) such that during polymerization, the exothermic heat of reaction is substantially the only heat energy used to accomplish polymerization, crosslinking and to drive off sufficient water to obtain a solid crosslinked resin having a water content of 15 percent by weight or less.

2. The method of claim 1 wherein the combined concentration of the monomers (A), (B) and (C) is at least 30 wt. % and less than 70 wt. %.

3. The method of claim 1 wherein monomer (C) is selected from the group consisting of N,N'-methylenebisacrylamide and N,N'-methylenebismethacrylamide.

4. The method of claim 1 wherein the potassium alkali and the ammonium alkali are selected from the group consisting of potassium hydroxide, potassium carbonate, potassium bicarbonate, ammonia, ammonium hydroxide, ammonium carbonate and ammonium bicarbonate.

5. The method of claim 1 wherein the ratio of potassium ions to ammonium ions in the mixed salt polyacrylate ranges from about 70:30 to 30:70.

6. The method of claim 5 wherein the ratio of potassium ions to ammonium ions in the mixed salt polyacrylate ranges from about 55:45 to about 45:55.

7. The method of claim 1 wherein the mixed monomer solution consists essentially of the monomers (A), (B) and (C).

8. A method of increasing the yield of a germinating sod crop comprising contacting a root of a grass plant with an aqueous gel comprising from about 0.4% to about 0.7% by weight of a mixed potassium and ammonium salt of a crosslinked, copolymerized or homopolymerized acrylate and covering the root of the grass plant and the aqueous gel with soil; wherein the mixed potassium and ammonium salt of a crosslinked, copolymerized or homopolymerized acrylate is prepared by mixing a monomer solution of (A) acrylic acid neutralized 70–100 mole percent with a potassium alkali and an ammonium alkali; (B) acrylamide in a mole ratio of 70 to 100 mole percent acrylic acid to 30 to 0 mole percent acrylamide and (C) a water-miscible to water-soluble polyvinyl monomer in a combined concentration of (A), (B) and (C) of at least 30 wt. %; with water to form a mixed monomer solution and initiating polymerization of monomers (A), (B) and (C) such that during polymerization, the exothermic heat of reaction is substantially the only heat energy used to accomplish polymerization, crosslinking and to drive off sufficient water to obtain a solid crosslinked resin having a water content of 15 percent by weight or less.

9. A method of increasing the yield of a sod crop comprising contacting a grass seed with an aqueous gel comprising from about 0.4% to about 0.7% by weight of a mixed potassium and ammonium salt of a crosslinked, copolymerized or homopolymerized acrylate and covering the grass seed and the aqueous gel with soil; wherein the mixed potassium and ammonium salt of a crosslinked, copolymerized or homopolymerized acrylate is prepared by mixing a monomer solution of (A) acrylic acid neutralized 70–100 mole percent with a potassium alkali and an ammonium alkali; (B) styrene in an amount of 0% to 25% based on the weight of acrylic acid and (C) a water-miscible to water-soluble polyvinyl monomer in a combined concentration of (A), (B) and (C) of at least 30 wt. %; with water to form a mixed monomer solution and initiating polymerization of monomers (A), (B) and (C) such that during polymerization, the exothermic heat of reaction is substantially the only heat energy used to accomplish polymerization, crosslinking and to drive off sufficient water to obtain a solid crosslinked resin having a water content of 15 percent by weight or less.

10. The method of claim 9 wherein the combined concentration of the monomers (A), (B) and (C) is at least 30 wt. % and less than 70 wt. %.

11. The method of claim 9 wherein monomer (C) is selected from the group consisting of N,N'-methylenebisacrylamide and N,N'-methylenebismethacrylamide.

12. The method of claim 9 wherein the potassium alkali and the ammonium alkali are selected from the group consisting of potassium hydroxide, potassium carbonate, potassium bicarbonate, ammonia, ammonium hydroxide, ammonium carbonate and ammonium bicarbonate.

13. The method of claim 9 wherein the ratio of potassium ions to ammonium ions in the mixed salt polyacrylate ranges from about 70:30 to 30:70.

14. The method of claim 13 wherein the ratio of potassium ions to ammonium ions in the mixed salt polyacrylate ranges from about 55:45 to about 45:55.

15. The method of claim 9 wherein the mixed monomer solution consists essentially of the monomers (A), (B) and (C).

16. A method of increasing the yield of a sod crop comprising contacting a grass seed with an aqueous gel comprising from about 0.4% to about 0.7% by weight of a mixed potassium and ammonium salt of a crosslinked, copolymerized or homopolymerized acrylate and covering the grass seed and the aqueous gel with soil; wherein the mixed potassium and ammonium salt of a crosslinked, copolymerized or homopolymerized acrylate is prepared by mixing a monomer solution of (A) acrylic acid neutralized 70–100 mole percent with a potassium alkali and an ammonium alkali; (B) acrylamide in a mole ratio of 70 to 100 mole percent acrylic acid to 30 to 0 mole percent acrylamide and (C) a water-miscible to water-soluble polyvinyl monomer in a combined concentration of (A), (B) and (C) of at least 30 wt. %; with water to form a mixed monomer solution and initiating polymerization of monomers (A), (B) and (C) such that during polymerization, the exothermic heat of reaction is substantially the only heat energy used to accomplish polymerization, crosslinking and to drive off sufficient water to obtain a solid crosslinked resin having a water content of 15 percent by weight or less.

17. A method of promoting the root formation and vegetative growth of transplanted sod comprising contacting a root area of the transplanted sod with an aqueous gel comprising from about 0.4% to about 0.7% by weight of a mixed potassium and ammonium salt of a crosslinked, copolymerized or homopolymerized acrylate; wherein the mixed potassium and ammonium salt of a crosslinked, copolymerized or homopolymerized acrylate is prepared by mixing a monomer solution of (A) acrylic acid neutralized 70–100 mole percent with a potassium alkali and an ammonium alkali; (B) styrene in an amount of 0% to 25% based on the weight of acrylic acid and (C) a water-miscible to water-soluble polyvinyl monomer in a combined concentration of (A), (B)

and (C) of at least 30 wt. %; with water to form a mixed monomer solution and initiating polymerization of monomers (A), (B) and (C) such that during polymerization, the exothermic heat of reaction is substantially the only heat energy used to accomplish polymerization, crosslinking and to drive off sufficient water to obtain a solid crosslinked resin having a water content of 15 percent by weight or less.

18. The method of claim 17 wherein the combined concentration of the monomers (A), (B) and (C) is at least 30 wt. % and less than 70 wt. %.

19. The method of claim 17 wherein monomer (C) is selected from the group consisting of N,N'-methylenebisacrylamide and N,N'-methylenebismethacrylamide.

20. The method of claim 17 wherein the potassium alkali and the ammonium alkali are selected from the group consisting of potassium hydroxide, potassium carbonate, potassium bicarbonate, ammonia, ammonium hydroxide, ammonium carbonate and ammonium bicarbonate.

21. The method of claim 17 wherein the ratio of potassium ions to ammonium ions in the mixed salt polyacrylate ranges from about 70:30 to about 30:70.

22. The method of claim 21 wherein the ratio of potassium ions to ammonium ions in the mixed salt polyacrylate ranges from about 55:45 to about 45:55.

23. A method of promoting the root formation and vegetative growth of transplanted sod comprising contacting a root area of the transplanted sod with an aqueous gel comprising from about 0.4% to about 0.7% by weight of a mixed potassium and ammonium salt of a crosslinked, copolymerized or homopolymerized acrylate; wherein the mixed potassium and ammonium salt of a crosslinked, copolymerized or homopolymerized acrylate is prepared by mixing a monomer solution of (A) acrylic acid neutralized 70-100 mole percent with a potassium alkali and an ammonium alkali; (B) acrylamide in a mole ratio of 70 to 100 mole percent acrylic acid to 30 to 0 mole percent acrylamide and (C) a water-miscible to water-soluble polyvinyl monomer in a combined concentration of (A), (B) and (C) of at least 30 wt. %; with water to form a mixed monomer solution and initiating polymerization of monomers (A), (B) and (C) such that during polymerization, the exothermic heat of reaction is substantially the only heat energy used to accomplish polymerization, crosslinking and to drive off sufficient water to obtain a solid crosslinked resin having a water content of 15 percent by weight or less.

* * * * *